United States Patent
Takagi et al.

(10) Patent No.: US 7,688,460 B2
(45) Date of Patent: Mar. 30, 2010

(54) COMMUNICATION TERMINAL FOR ACCESSING AND PRINTING PAGE DATA FROM LINKS

(75) Inventors: Eiichi Takagi, Kanagawa (JP); Tsutomu Inose, Kanagawa (JP); Haruhisa Suzuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 2191 days.

(21) Appl. No.: 10/178,362

(22) Filed: Jun. 25, 2002

(65) Prior Publication Data

US 2003/0007174 A1 Jan. 9, 2003

(30) Foreign Application Priority Data

Jul. 5, 2001 (JP) ............................. 2001-204800

(51) Int. Cl.
*G06F 3/12* (2006.01)
*G06F 15/00* (2006.01)

(52) U.S. Cl. .................................... 358/1.15; 358/1.14

(58) Field of Classification Search ................ 358/1.14, 358/1.15
See application file for complete search history.

(56) References Cited

U.S. PATENT DOCUMENTS

| 5,727,135 | A | * | 3/1998 | Webb et al. ................ 358/1.14 |
| 5,857,211 | A | | 1/1999 | Carper et al. |
| 6,222,634 | B1 | * | 4/2001 | Dubbels et al. ............ 358/1.15 |
| 6,314,432 | B1 | * | 11/2001 | Potts, Jr. .................. 707/104.1 |
| 2002/0065671 | A1 | * | 5/2002 | Goerz et al. .................. 705/1 |

FOREIGN PATENT DOCUMENTS

| CN | 1218226 A | 6/1999 |
| CN | 1302030 A | 7/2001 |
| GB | 2342196 | 4/2000 |
| JP | 10-162030 | 6/1998 |
| KR | 1999-013421 | 2/1999 |

* cited by examiner

*Primary Examiner*—Twyler L Haskins
*Assistant Examiner*—Fred Guillermety
(74) *Attorney, Agent, or Firm*—Fitzpatrick, Cella, Harper & Scinto (57) ABSTRACT

An information processor and method enable a user to perform printing by using a printing instruction button in a simple easily-understandable process in a case where a link to printing contents is included in service contents.

7 Claims, 13 Drawing Sheets

`<a href="http://www.xxx.co.jp/next.htm">NEXT</a>`

FIG. 6

`<a href="printoto://www.xxx.co.jp/print.htm">PRINT</a>`

FIG. 7

`<a href="http://www.xxx.co.jp/print.htm" media="print">PRINT</a>`

FIG. 8

HTML DATA

801

PRINTING DATA

802 index

804

803 index

805

AAA AAA AAA AAAAAAAAAAA AAAAAAAAAAA AAAAAAAAAAA

FIG. 9

```
<?xml version="1.0" encoding="Shift_JIS"?>
<!DOCTYPE pml PUBLIC"-//CAN//DTD PML DOCUMENT INFO V0.05//EN">
<pml>
  <documentInfo paper="A4" scale="1" scaleFontSize="10pt" charactersPerLine="112"
                linesPerPage="72" baseFontSize="4" resolution="96" font="GOTHIC"/>
  <printerProfile src="http://www.can.co.jp/IAPrinting/B850.xml"/>
  <index totalPage="2">
    <indexPage no="1">
      <indexPageData title="MAP" src="http://www.can.co.jp/IAPrinting/93234343/Report_p1.xml"/>
    </indexPage>
    <indexPage no="2">
      <indexPageData title="PRICE LIST" src="http://www.can.co.jp/IAPrinting/93234343/Report_p2.xml"/>
    </indexPage>
  </index>
</pml>
```

COMMUNICATION TERMINAL FOR ACCESSING AND PRINTING PAGE DATA FROM LINKS

BACKGROUND OF THE INVENTION

1. Field of the Invention

The present invention relates to a printing service performed through a server/client system in the Internet using an information processor capable of browsing information on the Internet and printing information displayed by browsing, e.g., a printer capable of displaying World Wide Web (WWW) information described in hyper text markup language (HTML) and printing based on the information.

2. Related Background Art

Information provision services using display data described in markup languages such as compact HTML and HDML are being offered as services available through portable terminals (mobile terminals) such as portable telephones.

SUMMARY OF THE INVENTION

However, information displayed on portable terminals by conventional methods is simplified information, and portable terminals can perform only simple operations by a piece of browsing software (hereinafter referred to as "browser") because of a memory restriction, etc.

Therefore, portable terminals are incapable of either of display and acquisition of detailed information or information on finely designed contents, which can be browsed through a personal computer or the like. Also, when home page information selected to be obtained in the form of a print is received by a facsimile machine, there is a need to temporarily stop communication and to again establish a connection to enable facsimile transmission/reception. Further, Internet fax presupposes mail exchange transmission/reception and there is no conjunction between an Internet fax service and an information provision service. Therefore troublesome operations and high-priced equipment are required for Internet fax.

In view of the above-described problem, an object of the present invention is to provide an information processor and method enabling a user to perform printing by using a portable terminal such as a portable telephone, a fax terminal, a printer capable of being connected to a telephone, or the like to obtain detailed information without using a high-priced information processor such as a personal computer in such a manner that a description of a hyperlink (e.g., a URL) to printing contents is added to display contents (e.g., HTML data) for providing information, and a server converts printing contents into data in a markup language suitable for printing to enable a printer to print the converted data in the markup language.

In particular, in a case where it is difficult for the user to ascertain whether a link to printing contents is contained in service contents, and where if a link to printing contents is displayed while printing processing of them cannot be performed, the user may provide a printing instruction by assuming that printing can be performed. The system is inconvenient for the user in this respect. In view of this problem, an arrangement is provided to enable the user to perform printing using printing contents by operating a printing instruction button in a simple easily-understandable process in a case where a link to the printing contents is included in service contents.

DETAILED DESCRIPTION OF THE PREFERRED EMBODIMENTS

Figure 1:
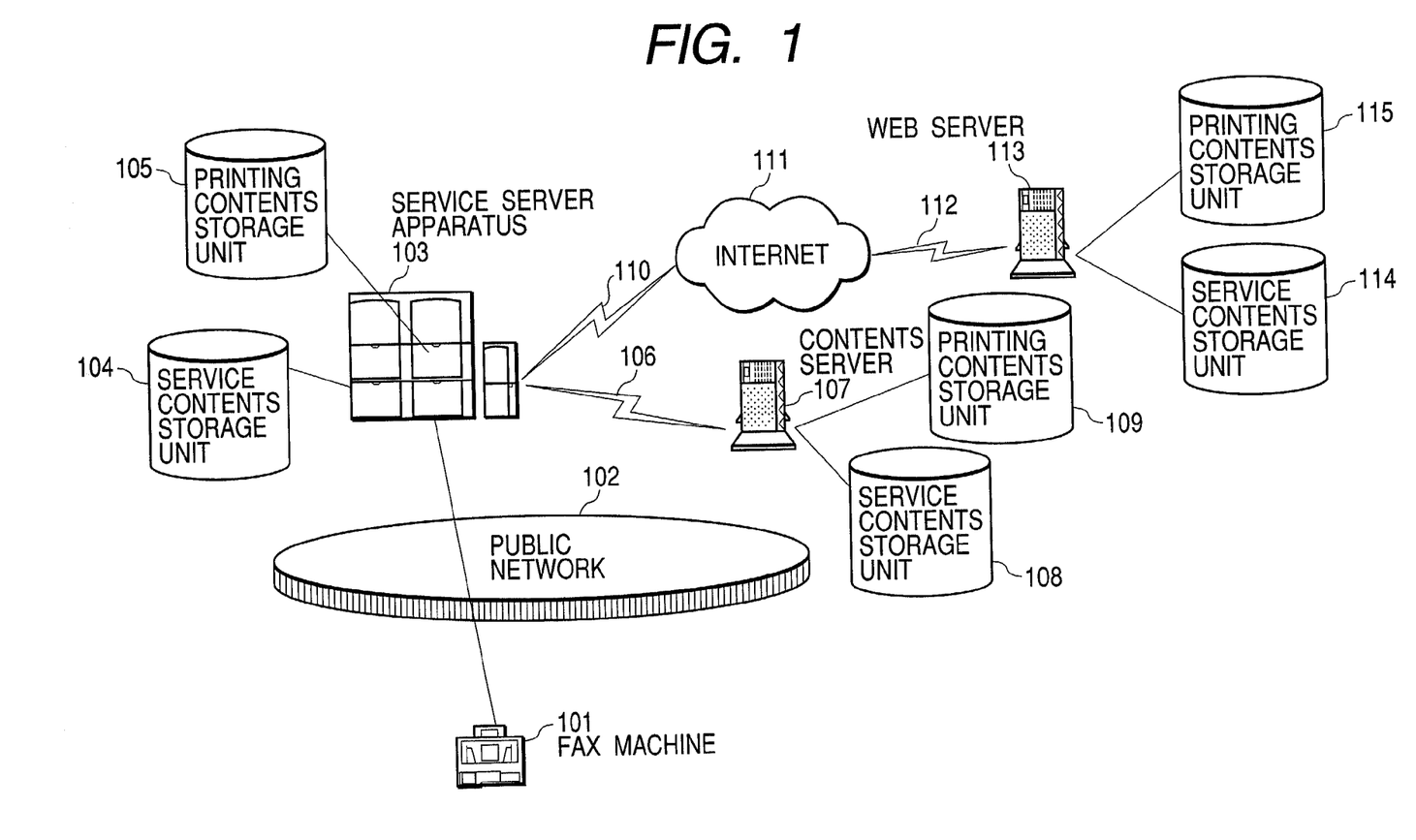
FIG. 1 is a diagram showing the configuration of a system for providing a service.

FIG. 1 shows a service system to which the present invention is applied. In FIG. 1 are illustrated a telephone set 101 (hereinafter referred to as "fax machine") having a fax function compatible with a service realized by the service system, a public network 102, and a service server apparatus 103 which provides the service to the telephone set. A storage unit 104 is a storage in which service contents provided by the service and accessible by the service server apparatus 103 are stored. A printing contents storage unit 105 is a storage in which printing contents accessible by the service server apparatus 103 and different from service contents are stored. The service server apparatus 103 is connected a private line 106.

"Service contents" is a generic name of various sorts of information provided by the service. Service contents are processed and displayed by the telephone set compatible with the service. For example, HTML data described in HTML, image data in a JPEG format or a bitmap format, and character data in a text format are provided as service contents. Printing contents are information for printing corresponding to service contents and used as a basis for good high-resolution printing. For example, printing contents are data described in a markup language for printing. Such printing contents are used for printing processing after being converted into printing data described in a print description language or a page description language, image data in a bitmap format, or the like.

A contents server apparatus 107 capable of communication with the service server apparatus 103 is connected to the private line 106. A service contents storage unit 108 is a storage in which service contents accessible by the convents server apparatus 107 are stored. A printing contents storage unit 109 is a storage in which printing contents accessible by the contents server apparatus are stored. The service server apparatus 103, the contents server apparatus 107, a Web server apparatus 113, etc., can communicate with each other thorough the Internet indicated by 111 and through an Internet connection 110.

The Web server apparatus 113 provides service contents corresponding to home pages, etc., to enable browsing of the home pages, etc., through a portable terminal, a telephone set compatible with the service, or the like. A service contents storage unit 114 is a storage in which service contents accessible from the Web server apparatus are stored. A printing contents storage unit 115 is a storage in which printing contents accessible from the Web server apparatus are stored.

The fax machine 101 in accordance with the present invention will be described with reference to the drawings. The present invention is not limited to the fax machine. The present invention can be applied to portable terminals to which a printer can be connected, portable telephones to which a printer can be connected, and office automation apparatuses, e.g., a copying machine, a copying combination machine, a laser beam printer and an ink jet printer.

Figure 15:
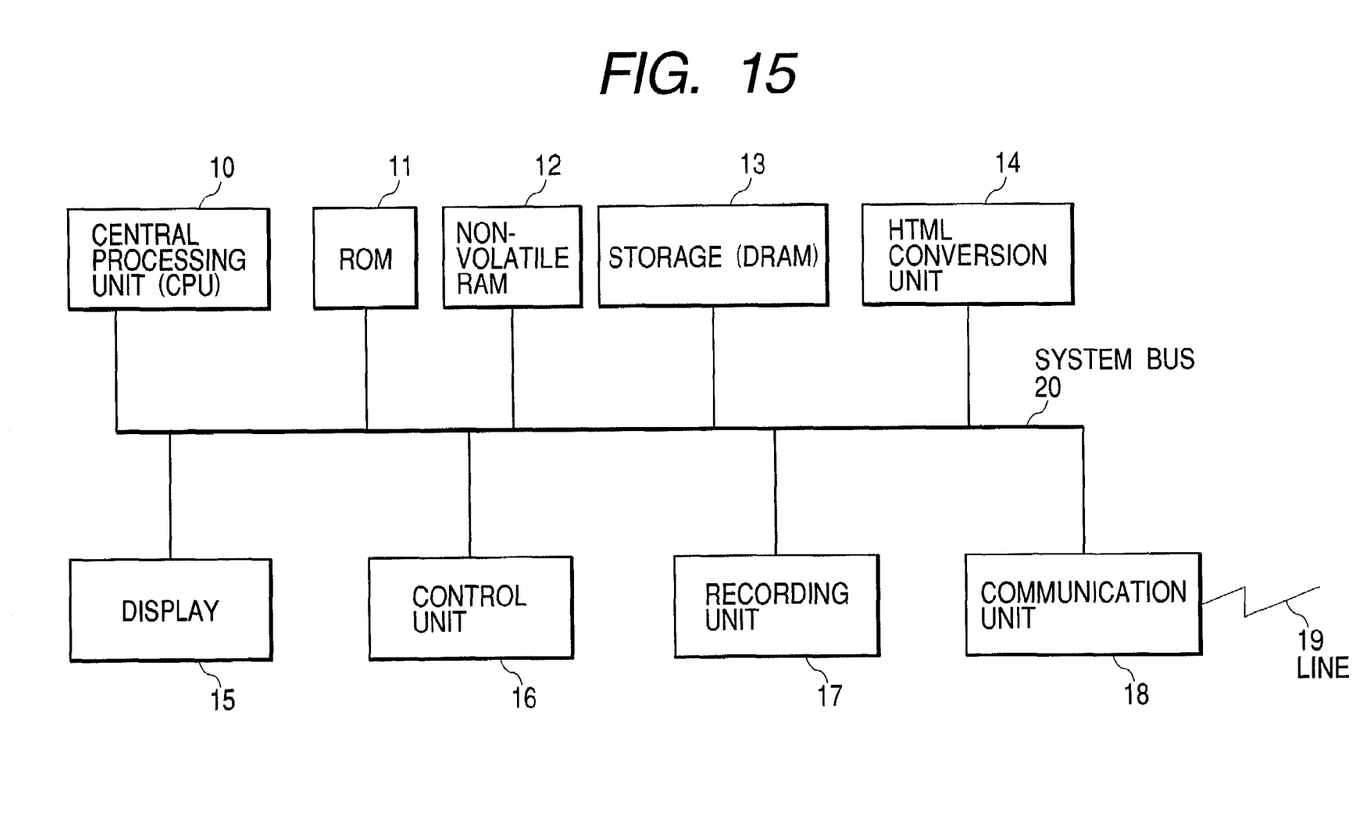
FIG. 15 is a diagram showing the configuration of the fax machine.

FIG. 15 is a diagram showing the configuration of an example of the fax machine 101. The fax machine 101 has, as shown in FIG. 15, a central processing unit (CPU) 10 for overall control of the fax machine, a read-only memory (ROM) 11 for storing programs and data, nonvolatile RAM 12 for storing backup data for personal data, a telephone directory, etc., and a storage (DRAM) 13 for storing CPU work data (data used by the CPU when the CPU is executing processing), HTML data, display data, recording data, etc. Processing executed by the fax machine 101 is controlled by the CPU 10 executing a program store din the ROM 11 or the DRAM 13.

The fax machine 101 also has an HTML conversion unit 14 which analyzes HTML data received through the Internet, separates, for example, image data or text data, and converts the separated data into display data or recording data. The HTML conversion unit 14 analyzes HTML data, obtains, if necessary, image data linked from the HTML data, and forms display data or recording data.

The fax machine 101 also has a display 15 for displaying the contents of received data, information on the state of the fax machine, etc., a control unit 16 constituted by a ten-key cluster, etc., and a communication unit 18 constituted by a modem for external communication through a telephone line 19. The processing units in the fax machine 101 are connected to each other by a system bus 20.

The fax machine 101 further has a recording unit (printing unit) 17 such as a printer which prints an image or a text on a recording sheet on the basis of image data or text data. The recording unit (printing unit) is, for example, an ink jet printer or a laser beam printer. The recording unit (printing unit) may be of a detachable type. In such a case, it is connected to the fax machine by a certain cable or wireless communication.

Figure 16:
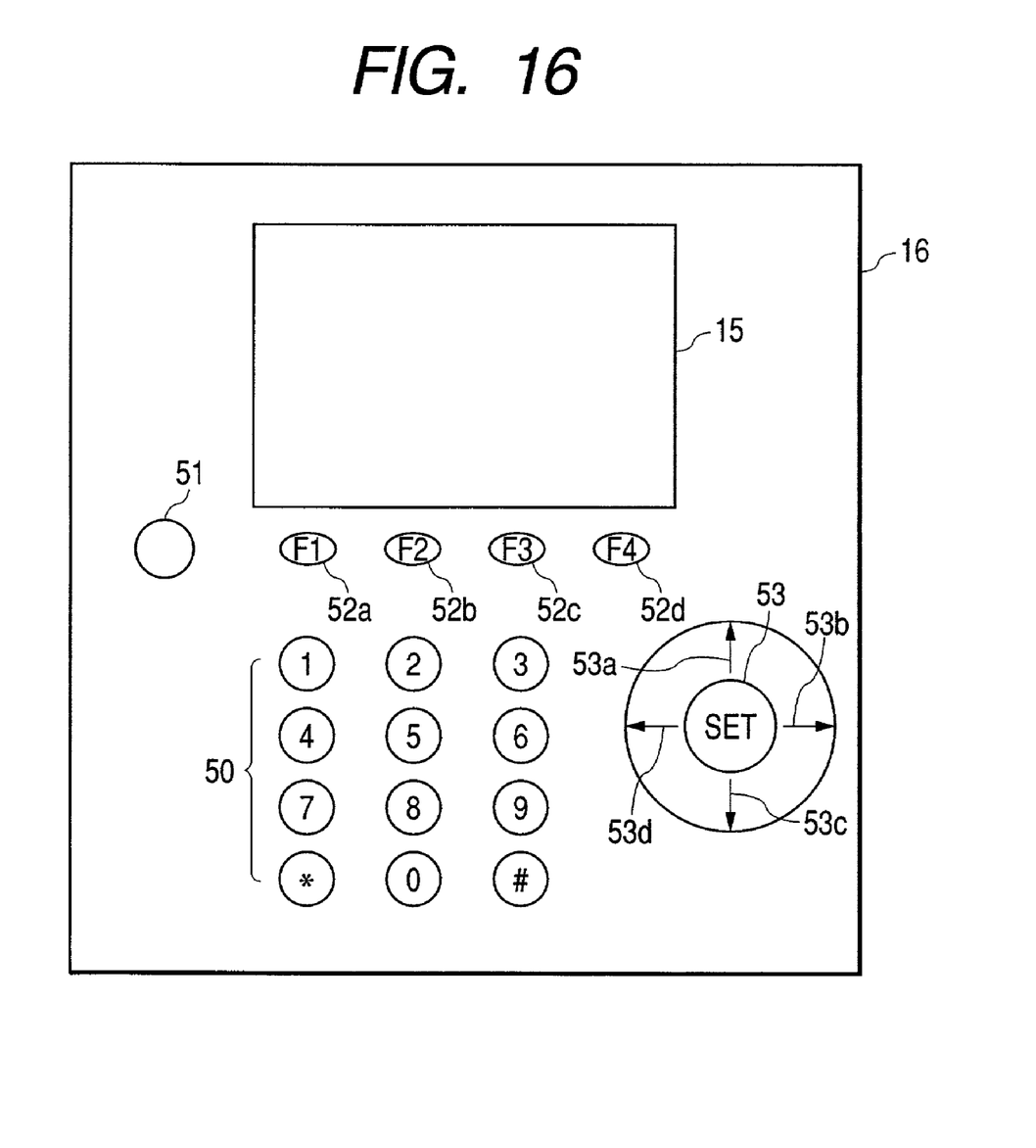
FIG. 16 is a diagram showing the configuration of a control unit.

FIG. 16 is a diagram showing the configuration of the control unit 16 of the fax machine. The control unit 16 is constituted by the display 15, which is a liquid crystal display or the like, a ten-key cluster 50 for inputting a telephone number, a uniform resource locator (URL), etc., a function key which is pressed to start function setting or the like 51, function keys 52*a*, 52*b*, 52*c*, and 52*d* used for a multi-input operation, vertical- and horizontal-arrow keys 53*a*, 53*b*, 53*c*, and 53*d* used to move a cursor on the display for example, and a setting key 54 operated to input a setting. In actuality, the display 15 corresponds to a dot-matrix LCD.

Figure 2:
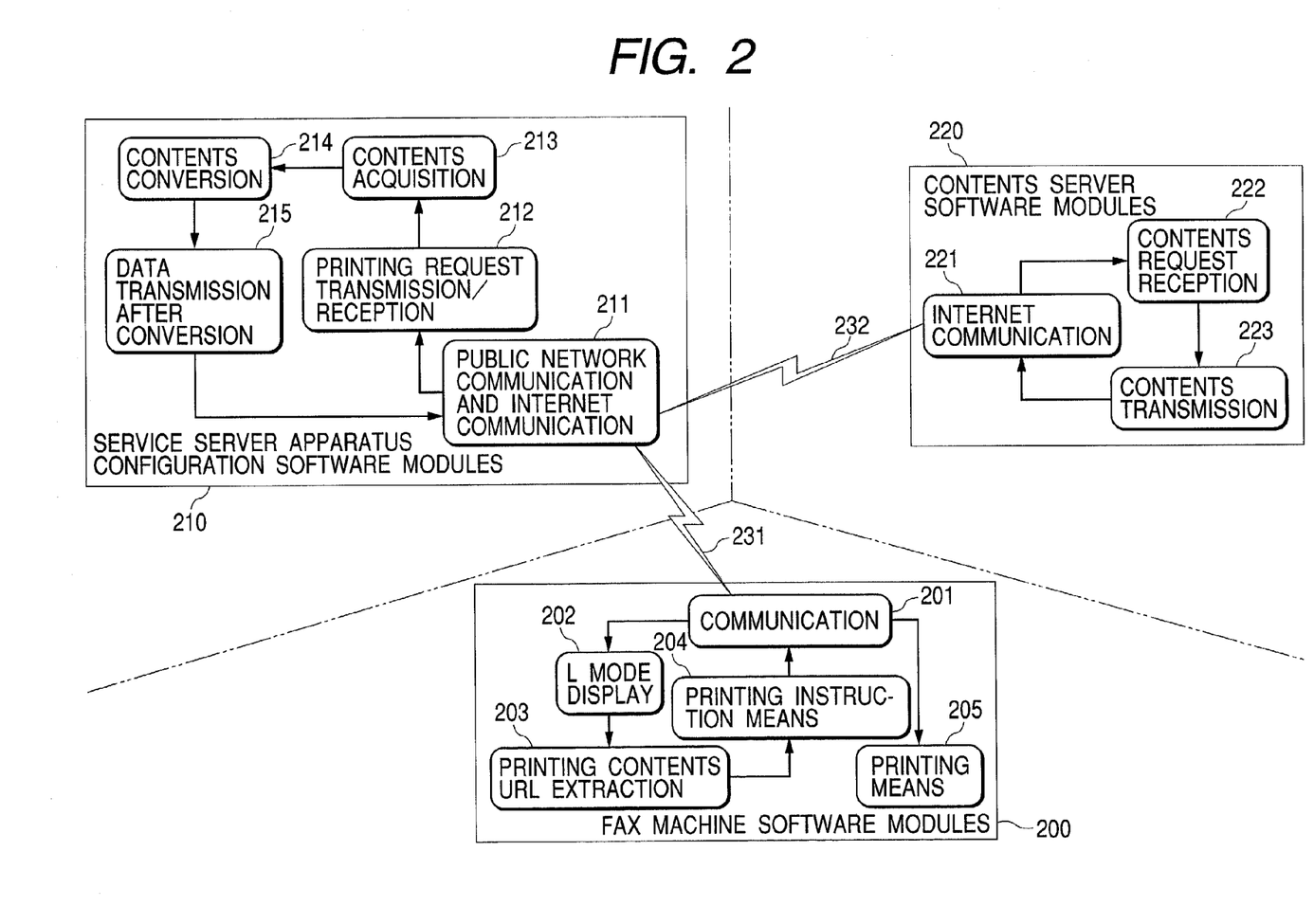
FIG. 2 is a diagram showing software modules necessary for the service.

FIG. 2 is a diagram showing software modules necessary for the service in this embodiment. In FIG. 2, software modules for the facsimile machine 101 are indicated by 200. Software modules 200 include a communication module 201 for performing communication with the service server apparatus 103 through the public network, a display module 202 for displaying received service contents on the display, and a URL extraction module 203 for extracting, from service contents, a URL designating a place where printing contents are stored. Designated data can be obtained from the designated server apparatus when the corresponding URL is designated. Software modules 200 also include a printing instruction module 204 for transmitting an extracted URL to the server apparatus to receive printing data, and a printing module 205 for making the printing unit print received printing data. In FIG. 2, a public network is indicated by 231.

Software modules for the service server 103 for performing the service are indicated by 210. Software modules 210 include a communication module 211 for communication with the server apparatus (107 or 113) or a service compatible terminal device through a public network, a private line or the Internet, a reception module 212 for receiving a request from the fax machine 101, an acquisition module 213 for obtaining request printing contents, a conversion module 214 for converted obtained printing contents into printing data, and a transmission module 215 for transmission to the fax machine making a request. In FIG. 2, a private line or the Internet is indicated by 232.

Software modules for the contents server apparatus 107 and the Web server apparatus 113 are indicated by 220. Software modules 220 include a communication module 221 for communication with the service server apparatus 103 through a private line or through the Internet, a reception module 222 for receiving a contents request, and a transmission module 223 for transmitting contents at a request.

Figure 3:
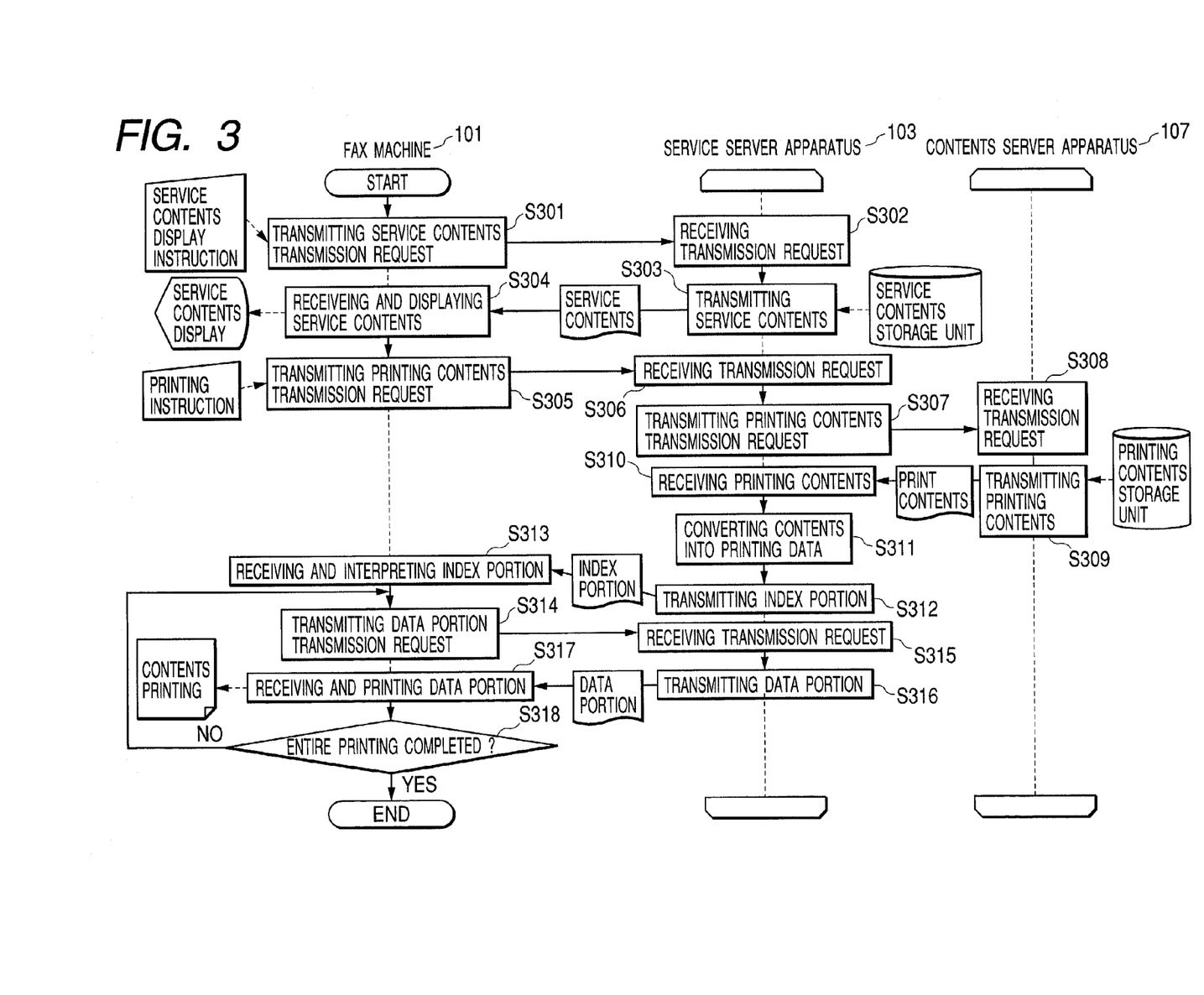
FIG. 3 is a flowchart showing processings respectively performed by a fax machine, a service server apparatus, and a contents server apparatus.

A sequence of operations in the system constituted by the units and apparatuses shown in FIG. 1 and the software modules shown in FIG. 2 in a case where the service server apparatus 103 has service contents and where the contents server apparatus 107 has printing contents will now be described. FIG. 3 is a flowchart showing processings respectively performed by the fax machine 101, the service server apparatus 103 and the contents server apparatus 107. The operation of the present invention will be described with reference to FIG. 3.

Referring to FIG. 3, steps S301, S304, S305, S313, S314, S317, and S318 are executed by the fax machine 101; steps S302, S303, S306, S307, S310, S311, S312, S315, and S316 are executed by the service server apparatus 103; and steps S308 and S309 are executed by the contents server apparatus 107.

First, when a user inputs an instruction to initiate the service, the fax machine 101 performs processing for establishing a connection to the service server apparatus 103 and then transmits a request for transmission of service contents to the service server apparatus 103 (step S301). The service server apparatus 103 receives the transmission request from the fax machine 101 (step S302), obtains service contents from the service contents storage unit 104, and transmits the service contents to the fax machine 101 (step S303).

The fax machine 101 receives the service contents and displays details of the service contents (step S304). At this time, the fax machine 101 analyzes the service contents and displays an image and characters on the display on the basis of details of the service contents recognized by the analysis.

Figure 4:
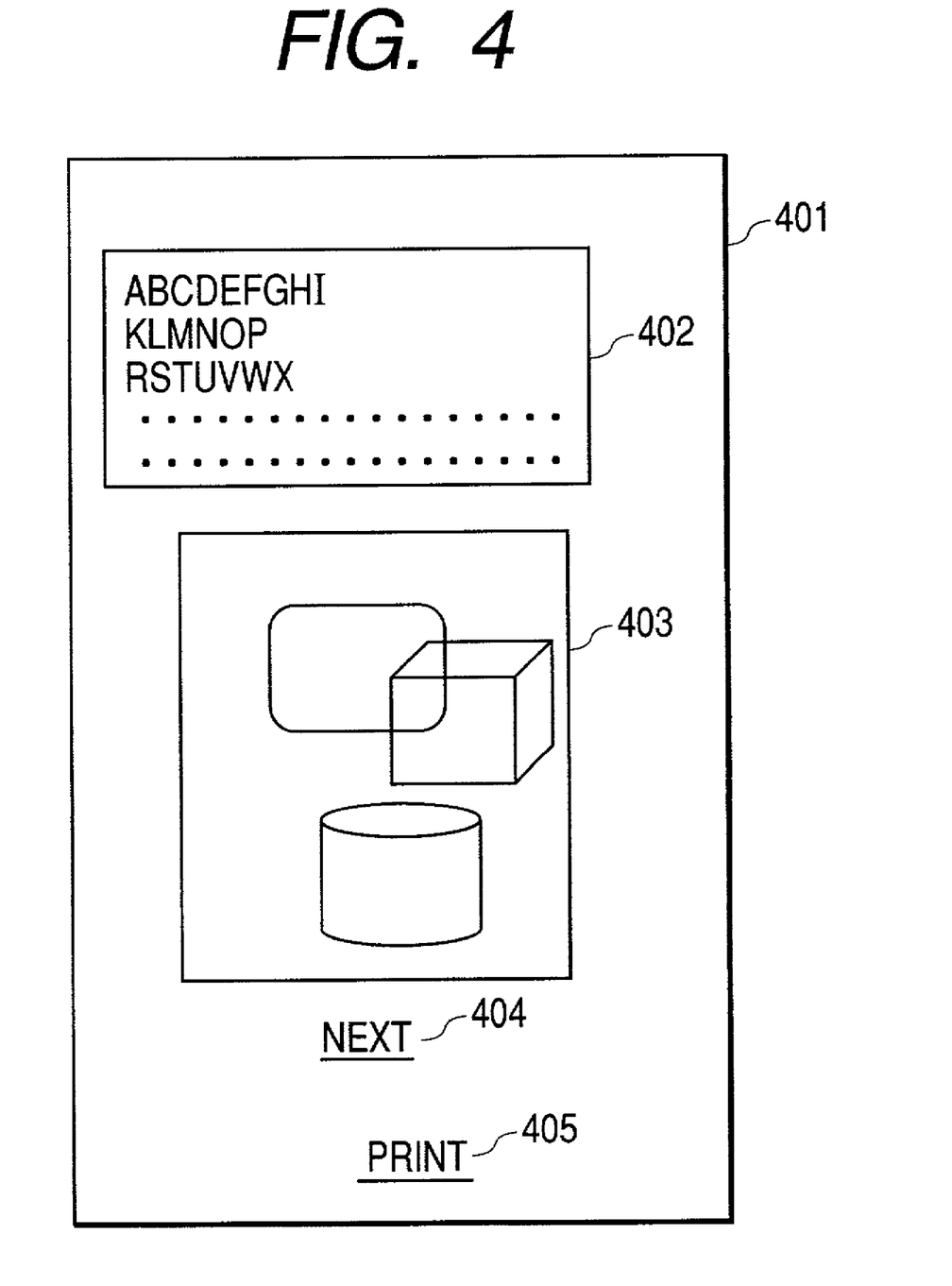
FIG. 4 is a diagram showing an example of a display based on service contents described in HTML.

FIG. 4 is a diagram showing an example of a display based on service contents described in HTML for example. The display screen of the fax machine 101 is indicated by 401. A sentence in a text format is displayed in a display area 402, and an image based on image data is displayed in a display area 403.

Figure 5:
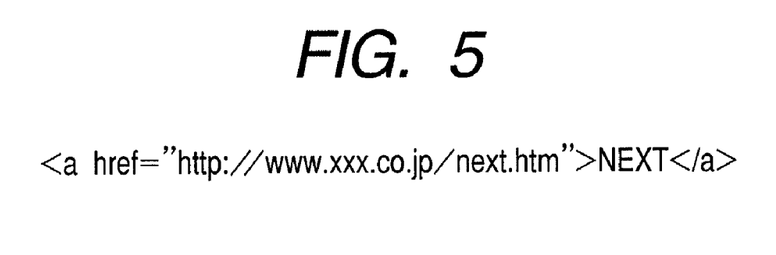
FIG. 5 is a diagram showing an example of a description of a link to service contents.

There is a link 404 to other service contents. Since there is a designated URL corresponding to the link 404 to the service contents, the service contents are newly obtained on the basis of the designated URL when the user selects or designates the link 404. For example, in a case where there is a description such as that shown in FIG. 5, when the link 404 is selected or designated, a request is made for transmission of service contents represented by "http://www.xxx.co.jp/next.html" from the service server apparatus 103, and processing for displaying the obtained contents on the display is performed.

Figure 6:
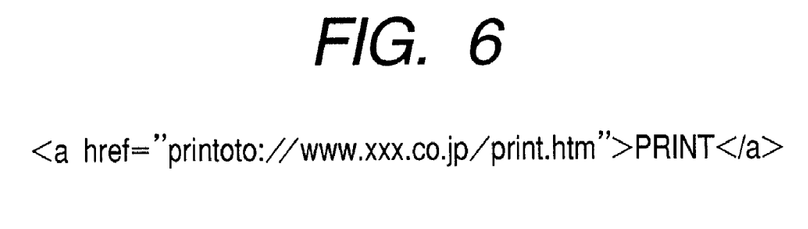
FIG. 6 is a diagram showing an example of a description of a link to printing contents.
Figure 7:
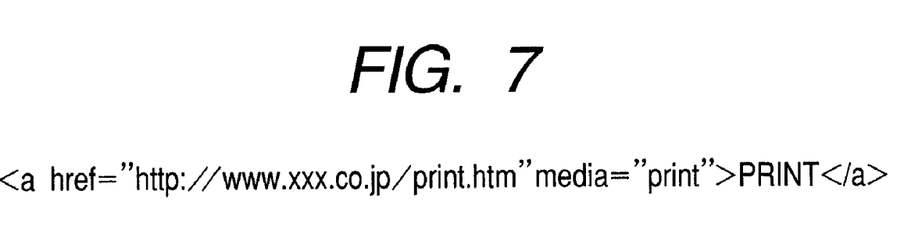
FIG. 7 is a diagram showing an example of a description of a link to printing contents.

There is a link 405 to printing contents. Since there is a designated URL corresponding to the link 405 to the printing contents, a request is made for the printing contents on the basis of the designated URL when the user selects or designates the link 405. Printing data converted from the printing contents is thereby obtained. FIGS. 6 and 7 show examples of a description for a link to printing contents. In a case where there is a description such as that shown in FIG. 6, when the link 405 is selected or designated, a request is made for printing contents represented by "printto://www.xxx.co.jp/print.html". In a case where there is a description such as that shown in FIG. 7, a request is made for printing contents represented by "http://www.xxx.co.jp/print.html".

The fax machine makes a determination to make a request for service contents or to make a request for printing contents according to the description contents. For example, from "printto" in the description shown in FIG. 6, it is determined that the designated link is a link to printing contents, and a request for the printing contents is made. From "media="printto"" in the description shown in FIG. 7, it is determined that the designated link is a link to printing contents.

Thus, when the user selects or designates a link on the display, the fax machine determines whether the selected link or the selected URL is a link to printing contents. In the case of a link to printing contents, the fax machine requests the service server apparatus 103 to send the designated printing contents (step S305).

To select or designate a link, the user presses the vertical- and horizontal-arrow keys 53a, 53b, 53c, and 53d to select a display portion representing the link on the screen of the display 15, and determines the selection by pressing the setting key 54. For example, the user may move a cursor or the like over display portions representing links by pressing the vertical- and horizontal-arrow keys 53a, 53b, 53c, and 53d and may press the setting key 54 to determine the link that the user wishes to select.

At this time, a message "Do you really require printing?" or the like may be given to the user of the fax machine 101 to again confirm his or her will to start printing. If the designated link is a link to service contents, the process returns to step S301 and the service server apparatus 103 is requested to set service contents.

When the fax machine 101 makes a request for transmission of printing contents, the service server apparatus 103 receives the printing contents transmission request (step S306). If the service server apparatus 103 determines that the requested printing contents exist in the contents server apparatus 107, it requests the contents server apparatus 107 to send the printing contents (step S307).

The contents server apparatus 107 receives the transmission request (step S308), reads out the requested printing contents from the printing contents storage unit 109 and transmits the printing contents read out (step S309).

The service server apparatus 103 converts the received printing contents into printing data which can be printed by the fax machine (step S311). The converted printing data is expressed, for example, in the extensible markup language (XML) format. It is constituted by an index portion for addition of information on a print page layout and a brief description of each page, and a data portion representing the contents of a print. The converted data may be described as a plurality of files.

Figure 8:
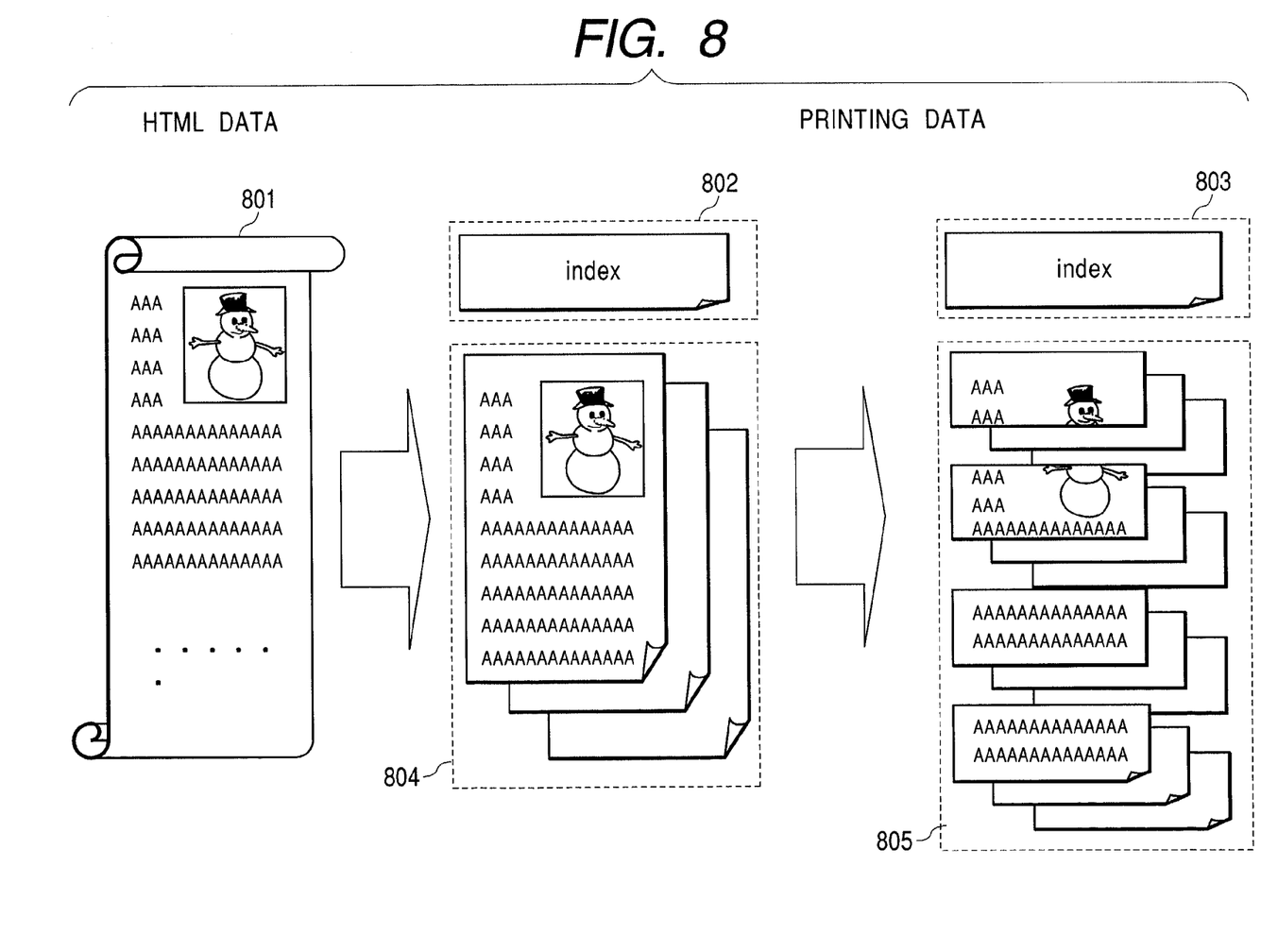
FIG. 8 is a diagram showing printing data.

FIG. 8 is a diagram showing the above-described printing data. A portion 801 is HTML data before conversion, described in HTML. Portions 802 and 803 are index portions of the printing data expressed in the XML format. Information on a print page layout and a brief description of each page is provided in the index portion.

A portion 804 is a data portion of the printing data divided on a page basis. A portion 805 is another example of the data portion of the printing data divided on a page basis and on a band basis. The data may be divided into smaller portions in this manner. With respect to this embodiment, it is assumed that the data portion is described in XHTML, and that the fax machine 101 can perform printing processing by interpreting the data described in XHTML. The data portion may be described in any data format, e.g., any other XML format such as SVG if it can be interpreted by the fax machine 101 and processible by printing processing.

Figure 9:
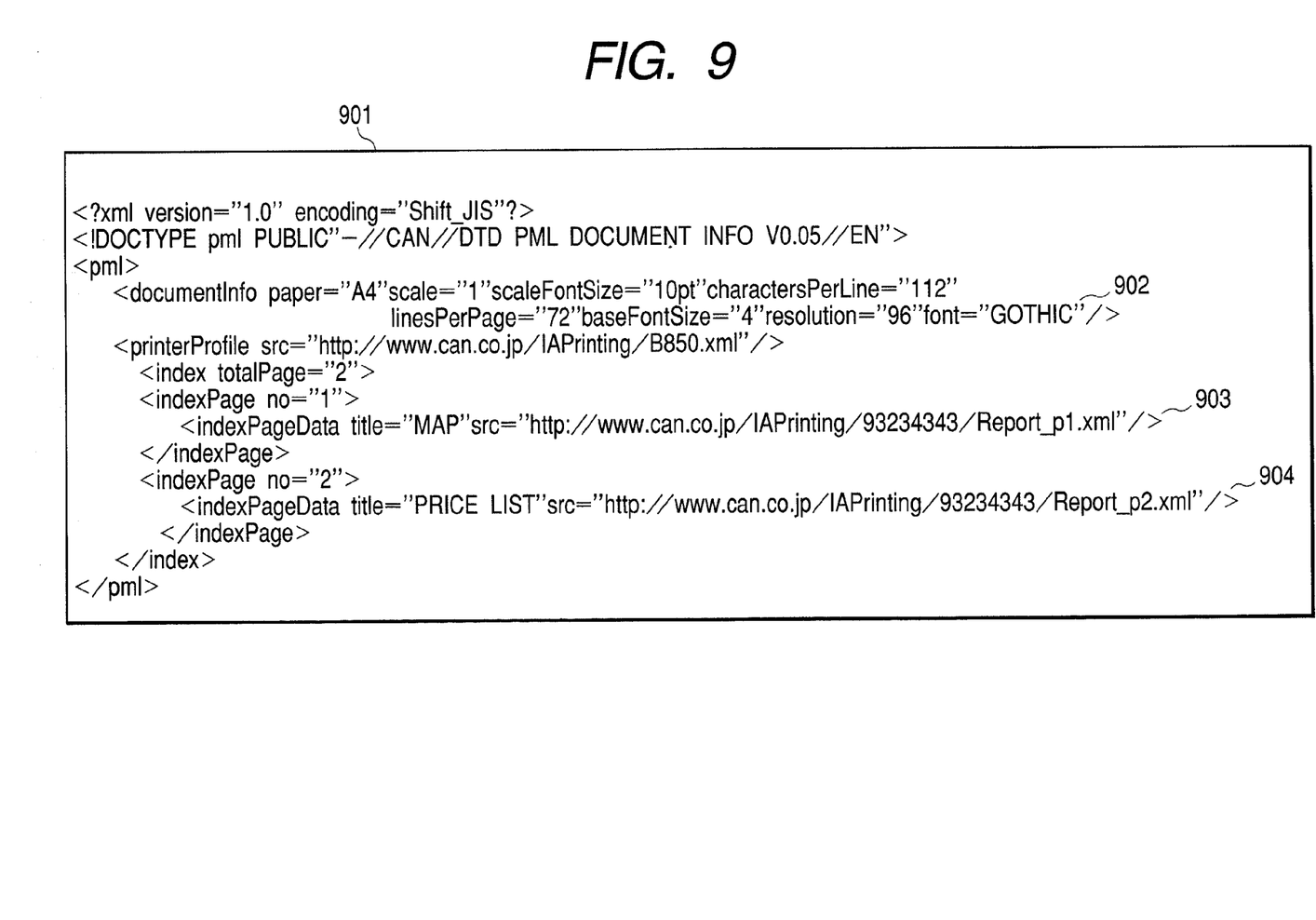
FIG. 9 is a diagram showing an index portion of printing data.

FIG. 9 is a diagram showing an example of a description in the index portion. A description 901 is an example of an index file in a case where the index portion is described as a file. As shown in FIG. 9, the index file is described in XML and includes a list of data items written as tags in correspondence with pages as well as page information and printer information necessary for printing. The tag designating each page has, as its attributes, a URL for identification of the data portion (URL necessary for obtaining data corresponding to the data portion) and a title provided as a brief description of the page.

In a portion 902, page information and printer information are described. In the example shown in FIG. 9, the sheet size is "A4", the scale is "1", the scale font size is "10 point", the resolution is "96 dpi", and the designated font is "Gothic".

In a portion 903, information about the first page data portion is described. A title of the first page is "map" and printing data for the first page is stored at "http://www.can.co.jp/IAPrinting/93234343/Report_p1.x ml". If this path is designated in step S314 in FIG. 3, the printing data corresponding to the first page can be obtained.

Similarly, in a portion 904, information about the second page data portion is described. A title of the second page is "price list" and printing data for the second page is stored at "http://www.can.co.jp/IAPrinting/93234343/Report_p2.x ml".

After printing data such as that described above has been formed in step S311, the service server apparatus 103 first transmits the index portion to the fax machine 101 (step S312). The fax machine 101 analyzes the index portion and displays page information on the basis of the results of this analysis.

Figure 10:
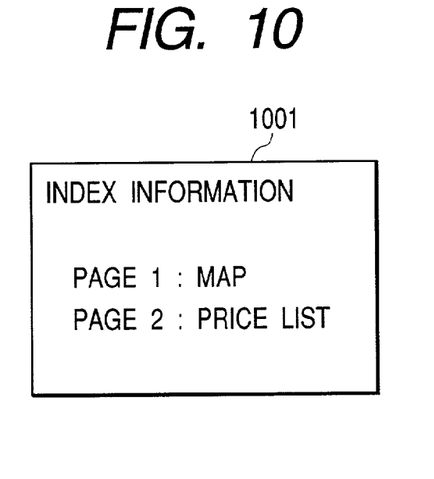
FIG. 10 is a diagram showing an example of display of the contents of the index portion.

FIG. 10 is a diagram showing an example of display of the contents of the index portion on the display screen. An image area imaged on the display of the fax machine 101 is indicated by 1001. When receiving the index portion, the fax machine 101 extracts page information from the index portion and displays a list of titles provided in the information in correspondence with pages, as shown in FIG. 10. If no titles are provided, only page numbers may be displayed.

The user checks the display contents, i.e., the number of print pages and brief descriptions of the pages, checks the content of the print, and continues the printing process. When checking these points, the user can cancel printing. Also, by checking the print contents, the user can designate part of the pages which he or she wants to print When given a printing instruction, the fax machine 101 transmits a request for transmission of the printing data portion to the service server apparatus 103 (step S314). At this time, if a certain page is designated, the fax machine 101 transmits a request for transmission of the printing data portion corresponding to the designated page.

The service server apparatus 103 receives the transmission request (step S315) and sends back the data portion (step S316). The fax machine 101 receives the data portion and performs printing on the basis of the printing data (step S317).

When the entire printing is thereby completed, the process is terminated. If the entire printing is not completed, the process returns to step S314 and printing processing is continued (step S318).

In the above-described process, the data portion is transmitted in step S316 after transmission of the index portion in step S312. However, the index portion and the data portion may be simultaneously transmitted from the service server apparatus 103 to the fax machine 101. In such a case, the fax machine 101 first receives the index portion and the data portion and produces a display such as shown in FIG. 10 on the basis of the contents of the index portion. The fax machine 101 processes the data portion corresponding to the page designated by the user with respect to the display shown in FIG. 10, thereby performing printing.

The embodiment of the present invention has been described with respect to the case where a link to printing contents is contained in service contents, and where printing processing is performed when the user selects it. In some case, however, it is difficult for the user to ascertain whether a link to printing contents is contained in service contents. A link to printing contents may be displayed even if printing processing of them cannot be performed. In such a situation, the user may provide a printing instruction by assuming that printing can be performed. The system is inconvenient for the user in this respect.

An arrangement will therefore be described which enables the user to perform printing using printing contents by operating a printing instruction button in a simple easily-understandable process in a case where a link to the printing contents is included in service contents. The printing instruction button is a button provided separately from the button clicked for linkage to printing contents. For example, referring to FIG. 16, the function of the printing instruction button is assigned to the function key 52a.

Figure 11:
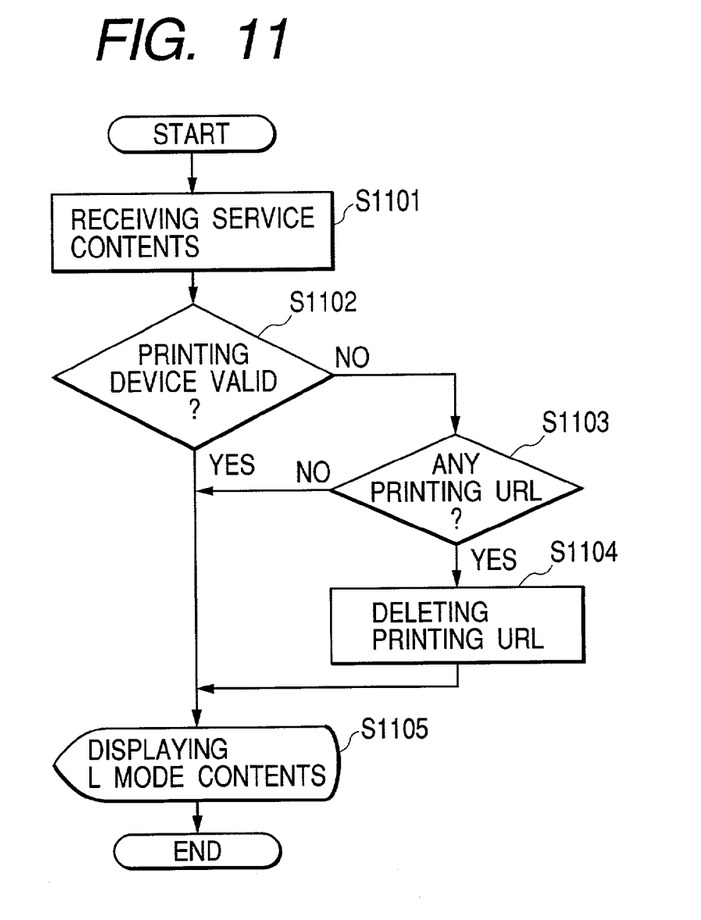
FIG. 11 is a flowchart showing service contents display processing

FIG. 11 is a diagram for further detailed description of the processing in step S304 shown in FIG. 3. First, the fax machine 101 receives service contents (step S1101). Next, a determination is made as to whether the printing function of the fax machine 101 can be used (step S1102). The printing function of the fax machine 101 cannot be used, for example, in a case where the user has made a setting not to use the printing function, in a case where printing sheet is not set, in a case where ink or toner used for printing has been used up, and the like.

If the printing function can be used, a display is produced on the display screen according to the contents of description of the service contents (step S1105). If the printing function cannot be used, a determination is then made as to whether there is a link to printing contents in the service contents (step S1103). This determination is made as to whether the a description such as shown in FIG. 6 or 7 exists.

If there is no link to printing contents, the process moves immediately to step S1105 and a display is produced. In a link to printing contents is included in the service contents, the link to printing contents is deleted in the service contents received in step S1101 (step S1104) and a display is thereafter produced in step S1105, thus preventing the user from erroneously selecting the link to printing contents when the printing function cannot be used.

While processing for deleting a link to printing contents is performed in the process shown in FIG. 11, it is not necessary to actually delete such a link. If there is a description of a link to printing contents is found in the course of display processing based on service contents, display processing may be performed while skipping the description of the link to printing contents during reading for processing.

Figure 12:
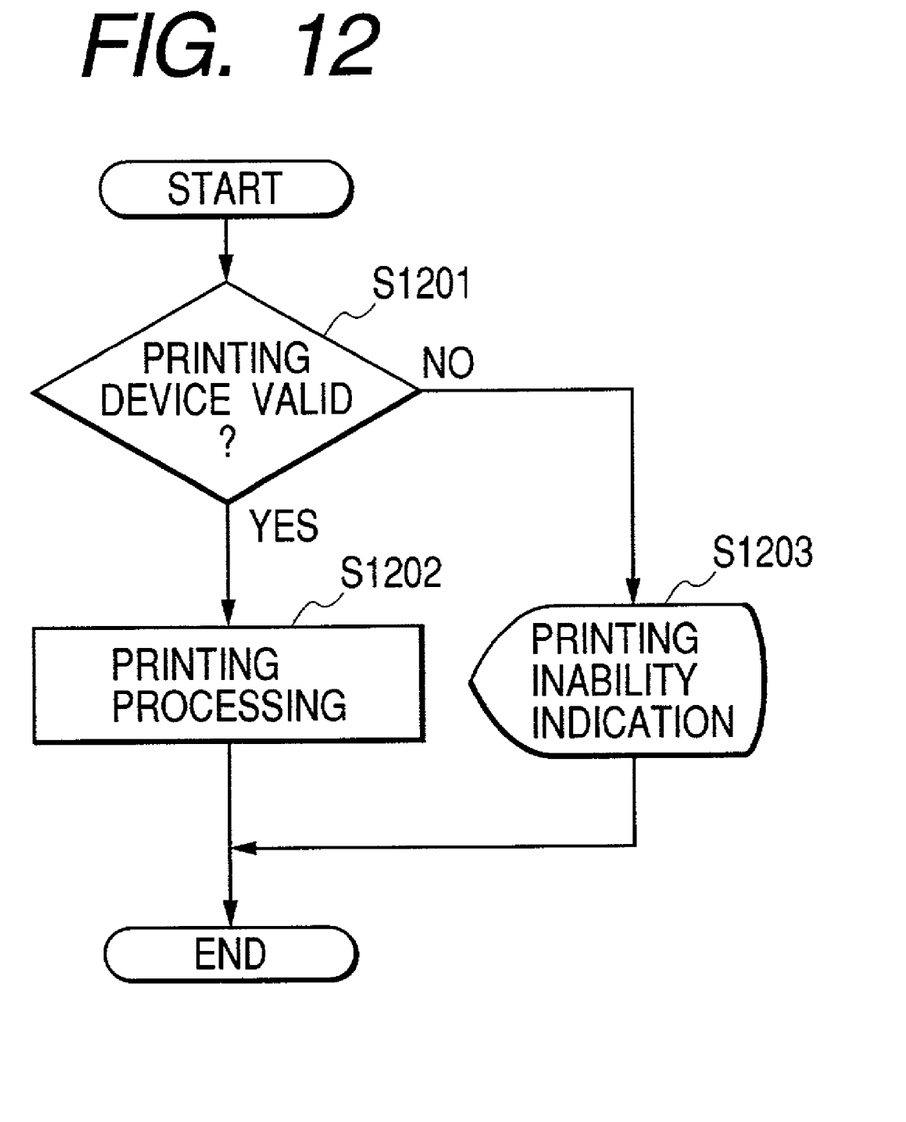
FIG. 12 is a flowchart showing processing when a printing instruction button is pressed.

FIG. 12 is a flowchart showing processing performed when the printing instruction button is pressed by the user after the processing in step S304 shown in FIG. 3. When the printing instruction button is pressed, a determination is first made as to whether the machine is in such a condition that the printing function can be used (step S1201). If the printing function can be used, printing processing (shown in detail in FIG. 13) is performed (step S1202). If the printing function cannot be used, an information indicating that printing cannot be performed is displayed (step S1203).

Figure 13:
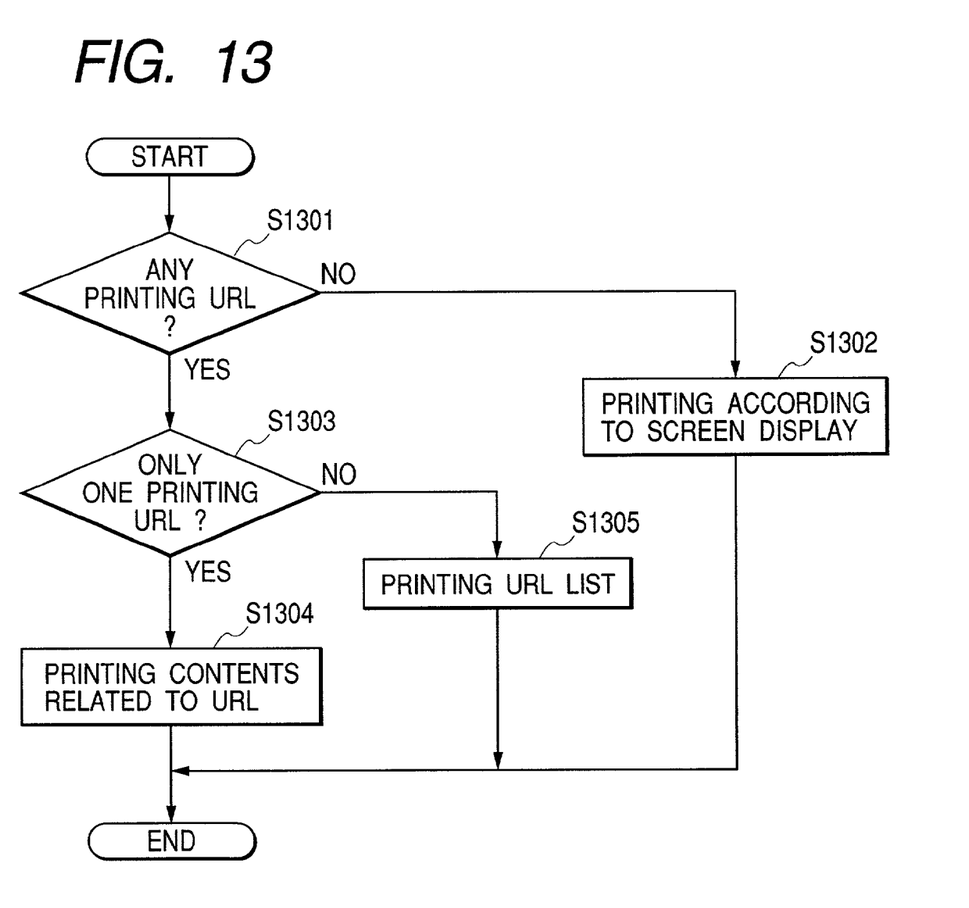
FIG. 13 is a flowchart showing processing when the printing instruction button is pressed.

FIG. 13 is a flowchart showing processing performed when a printing instruction is given independently of the description of service contents (for example, by means of the printing instruction button) while the machine is in such a condition that the printing function can be used. This processing is assumed to be performed in step S1202 shown in FIG. 12.

The fax machine 101 first determines whether there is a link to printing contents in the service contents (step S1301). If no link to printing contents is included, a display on the screen is printed. For example, the display data itself is printed.

If a link to printing contents is included, a determination is made as to whether where a plurality of links exist (step S1303). If only one link exists, printing data corresponding to the printing contents at the linkage destination is obtained to perform printing (step S1304). The processing in step S1304 is the same as that from steps S305 to step S318 shown in FIG. 3.

Figure 14:
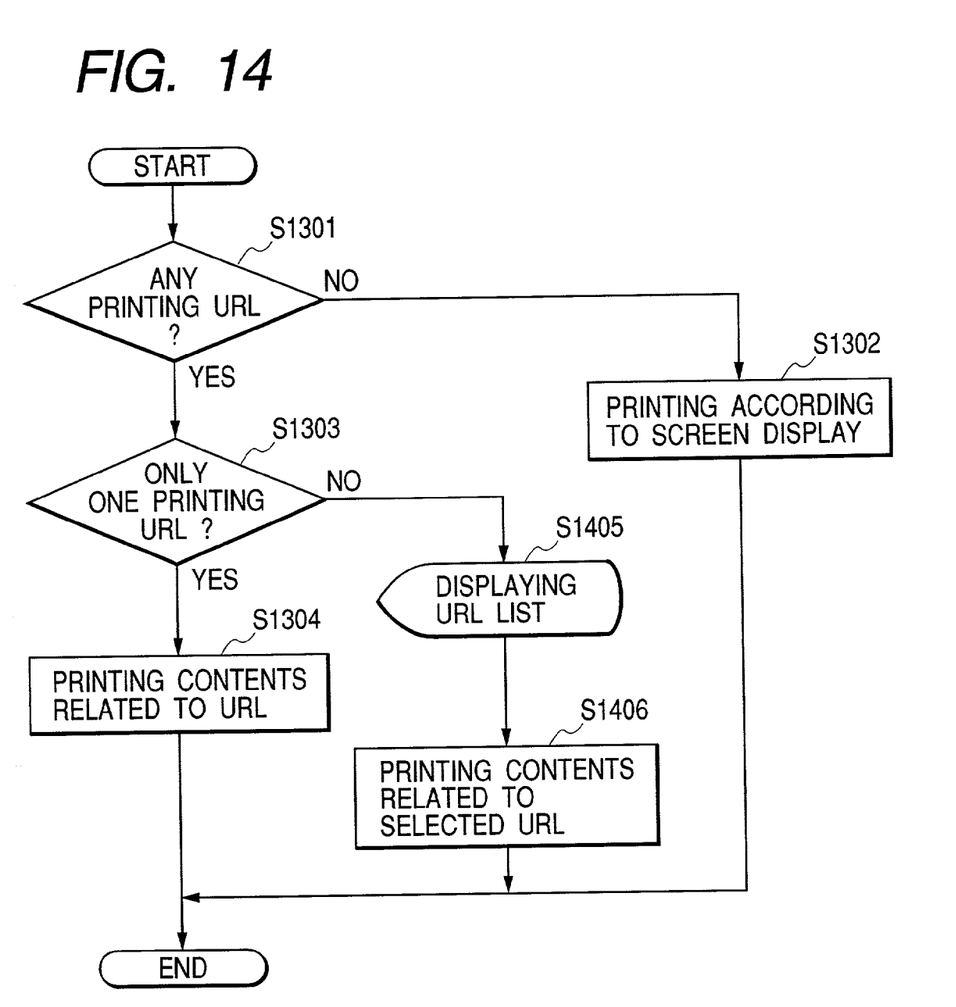
FIG. 14 is a flowchart showing processing when the printing instruction button is pressed.

If a plurality of links to printing contents exist, a list of URLs designating the linkage destinations is printed (step S1305). A URL list may be displayed on the display screen as shown in FIG. 14 (step S1405) instead of printing of the URL list. Also, printing may be performed on the basis of the printing contents at the URL selected by the user (step S1406).

While only one fax machine has been mentioned in the description of the embodiment, other fax machines, portable telephones and information portable terminals are communicable with the service server apparatus and the service can be provided thereto be executing the processing shown in FIG. 3.

The arrangement of the above-described embodiment may alternatively be such that, if, for example, the contents server apparatus 107 has a conversion module, not the service server apparatus 103 but the contents server 107 directly receives a printing contents request from the fax machine 101. Similarly, if the Web server 113 on the Internet has a conversion module, it may directly receive a request.

Printing contents may be a home page described in HTML such as to be able to be browsed by a personal computer, or may be a document file described in the XML format. In the conversion module, data may be processed according to a unit in which printing is performed, and information on contents may be converted without impairing the information.

Programs and data related to the present invention are stored on a floppy disk (FD) or a compact disc-read only memory (CD-ROM) and are supplied from the same to a computer. The object of the present invention can be achieved in such a manner that storage medium on which program codes (e.g., program codes corresponding to the steps shown in FIG. 3) of software (control program) for realizing the functions of the above-described embodiment are stored is supplied to a computer and a device in the computer (e.g., CPU 10) reads out and executes the program codes stored on the recording medium.

As a method for supplying such software and data to a computer, a method of storing the software and data on a floppy disk FD and supplying the disk to the computer main unit (by means of a floppy disk drive or the like) is ordinarily used. In such a case, the program codes themselves read out from the storage medium realize the functions of the above-described embodiment, and the storage medium on which the program codes are stored constitutes the present invention.

For example, as the storage medium for supplying the program codes, an optical disc, a magneto-optic disc, a CD-ROM, a compact disc-recordable (CD-R), a magnetic tape, a nonvolatile memory card, a ROM, etc., may be used as well as a floppy disk and a hard disk. Needless to say, the present invention comprises not only realization of the functions of the above-described embodiment achieved by executing the program codes read out by a computer but also realization of the functions of the above-described embodiment achieved by performing part or the whole of the actual processing by an operating system (OS) running on a computer on the basis of the instructions according to the program codes. Further, needless to say, the present invention comprises realization of the functions of the above-described embodiment achieved by performing processing in such a manner that the program codes read out from the storage medium are written to a memory provided on a function expansion board inserted in a computer or a function expansion unit connected to a computer, and a CPU or the like provided on the function expansion board or the function expansion unit performs part or the whole of the actual processing on the basis of the instructions according to the program codes.

According to the present invention, contents which have been obtained only by personal computers can be browsed and obtained by using a home fax machine. Further, printing data converted from printing contents is constituted by an index portion and a data portion, and information on details of various contents can be supplied as a list by using the index portion to enable users to obtain necessary information only.

Even in a case where it is difficult for a user to recognize that printing contents are included, the user is enabled to easily perform printing on the basis of printing contents without learning complicated operations to obtain the desired information in the form of a print.

What is claimed is:

1. A communication terminal comprising:
    display control means for controlling to display link information of print data, the link information being embedded in page data and linking to other page data, on a display unit;
    request means for requesting an external terminal to transmit the print data corresponding to the link information in accordance with an operation by a user selecting the link information of the print data embedded in the page data displayed on the display unit;
    printing means for performing print processing of the print data, which is transmitted from the external terminal in response to the request transmitted by the request means;
    determination means for determining whether a print function of the communication terminal is ready to be used;
    detecting means for detecting whether there is the link information embedded in the page data, if a result of the determination by the determination means indicates that the print function of the communication terminal is ready to be used; and
    print control means for controlling print processing in accordance with a result of a detection by the detecting means such that if the result of the detection by the detecting means indicates that there is no link information embedded in the page data, the printing means performs the print processing by using the page data displayed by the display control means, and if the result of the detection by the detecting means indicates that there is the link information embedded in the page data, the printing means obtains print data corresponding to the link information and performs the print processing by using the obtained print data,
    wherein said display control means controls to inhibit the display unit from displaying the link information of the print data, if the result of the determination by the determination means indicates that the print function of the communication terminal is not ready to be used.

2. The communication terminal according to claim 1, further comprising deletion means for deleting the link information of the print data from the page data, when the result of the determination by the determination means indicates that print function is not ready to be used.

3. The communication terminal according to claim 1, further comprising:
    list display means for displaying a list of the print data if the result of the detection by the detecting means indicates that there are a plurality of link information embedded in the page data; and
    selection means for selecting the link information from the list displayed by said list display means,
    wherein the printing means obtains the print data corresponding to the link information selected by the selecting means and performs the print processing by using the obtained print data.

4. The communication terminal according to claim 3, wherein if the result of the detection by the detecting means indicates that the plurality of link information are embedded in the page data, the print processing means performs the print processing by using the list of the link information.

5. A control method implemented in a communication terminal comprising:
    a display control step of controlling to display link information of print data, the link information being embedded in page data and linking to other page data, on a display unit;
    a request step of requesting an external terminal to transmit the print data corresponding to the link information in accordance with an operation by a user selecting the link information of the print data embedded in the page data displayed on the display unit;
    a printing step of performing print processing of the print data, which is transmitted from the external terminal in response to the request transmitted by the request step;

a determination step of determining whether a print function of the communication terminal is ready to be used;

a detecting step of detecting whether there is the link information embedded in the page data, if a result of the determination in the determination step indicates that the print function of the communication terminal is ready to be used; and a print control step of controlling print processing in accordance with a result of the detection in the detecting step such that if the result of the detection in the detecting step indicates that there is no link information embedded in the page data, the printing step performs the print processing by using the page data displayed in the display control step, and if the result of the detection in the detecting step indicates that there is the link information embedded in the page data, the printing step obtains print data corresponding to the link information and performs the print processing by using the obtained print data, wherein said display control step controls to inhibit the display unit from displaying the link information of the print data if the result of the determination in the determination step indicates that the print function of the communication terminal is not ready to be used.

6. The control method according to claim 5, further comprising a deletion step of deleting the link information of the print data from the page data when the result of the determination by the determination step indicates that print function is not ready to be used.

7. A computer readable storage medium on which is stored a control program to execute a control method for a communication terminal, said control method comprising:

a display control step of controlling to display link information of print data, the link information being embedded in page data and linking to other page data, on a display unit;

a request step of requesting an external terminal to transmit print data corresponding to the link information in accordance with an operation by a user selecting the link information of the print data embedded in the page data displayed on the display unit;

a printing step of performing print processing of the print data, which is transmitted from the external terminal in response to the request transmitted by the request step;

a determination step of determining whether a print function of the communication terminal is ready to be used;

a detecting step of detecting whether there is the link information embedded in the page data, if a result of the determination in the determination step indicates that the print function of the communication terminal is ready to be used; and a print control step of controlling print processing in accordance with a result of the detection in the detecting step such that if the result of the detection in the detecting step indicates that there is the link information embedded in the page data, the printing step performs the print processing by using the page data displayed in the display control step, and if the result of the detection in the detecting step indicates that there is the link information embedded in the page data, the printing step obtains print data corresponding to the link information and performs the print processing by using the obtained print data, wherein said display control step controls to inhibit the display unit from displaying the link information of the print data if the result of the determination by the determination step indicates that print function of the communication terminal is not ready to be used.

* * * * *